United States Patent
Fan (10) Patent No.: US 8,261,792 B2
(45) Date of Patent: Sep. 11, 2012

(54) AIRBAG FOR VEHICLE TIRES

(76) Inventor: Liang Fan, Nanjing (CN)

( * ) Notice: Subject to any disclaimer, the term of this patent is extended or adjusted under 35 U.S.C. 154(b) by 972 days.

(21) Appl. No.: 12/209,414

(22) Filed: Sep. 12, 2008

(65) Prior Publication Data

US 2009/0000719 A1 Jan. 1, 2009

Related U.S. Application Data

(63) Continuation of application No. PCT/CN2007/000834, filed on Mar. 15, 2007.

(30) Foreign Application Priority Data

Mar. 20, 2006 (CN) .......................... 2006 1 0038933

(51) Int. Cl.
- *B60C 5/00* (2006.01)
- *B60C 5/02* (2006.01)
- *B60C 17/00* (2006.01)
- *B60C 17/02* (2006.01)

(52) U.S. Cl. ...................... 152/331.1; 152/510; 152/511; 152/516; 428/34.1

(58) Field of Classification Search ................ 152/344.1, 152/345.1, 510, 511, 512, 516, 518, 519, 152/331.1, 334.1, 335.1, 336.1, 337.1, 338.1, 152/339.1, 340.1, 341.1, 342.1, 343.1, 152, 332.1, 333.1; 428/34.1
See application file for complete search history.

(56) References Cited

U.S. PATENT DOCUMENTS 3,724,521 A * 4/1973 Coddington et al. ...... 152/340.1

FOREIGN PATENT DOCUMENTS

| GB | 2024737 | * | 1/1980 |
| JP | 2004-330985 | * | 11/2004 |
| JP | 2005-53383 | * | 3/2005 |

* cited by examiner

*Primary Examiner* — Justin Fischer
(74) *Attorney, Agent, or Firm* — Matthias Scholl P.C.; Matthias Scholl (57) ABSTRACT

An airbag device for a vehicle tire capable of stabilizing the vehicle timely when the tire is exploding or being punctured suddenly to avoid potential accidents and to ensure driving comfort. The airbag device comprises a resilient outer ring installed between the tire and the wheel hub, and an inner ring serving to support the resilient outer ring. The resilient outer ring and the inner ring are compressed between the tire and the wheel hub under normal tire air pressure, and a space serving to increase driving comfortability and keep the outer ring from contacting the inner surface of the tire tread is designed between the resilient outer ring and the inner surface of the tire tread. When the tire is exploding or the air pressure of the tire is lost, the resilient outer ring is capable of bouncing instantly to support the weight of the vehicle.

5 Claims, 12 Drawing Sheets

AIRBAG FOR VEHICLE TIRES

BACKGROUND OF THE INVENTION

1. Field of the Invention

The invention relates to a vehicle tire safety device, and more particularly, to an airbag device for a vehicle tire, which allows the tire to continue operating safely after failure, e.g., explosion or puncture, without loss of stability and for an extended period of time without the need for tire replacement.

2. Description of the Related Art

Conventional vehicle tires are air-filled (pneumatic) and offer the advantages of good comfort and low road resistance. However, air-filled tires are prone to failure and loss of pressure at which time flat tires must be replaced immediately. Especially, when a tire has exploded or is punctured suddenly at a high running speed, the vehicle may lose balance potentially causing a serious accident. Many solutions to this problem have been proposed.

The solutions are mainly classified into two types. The first type is to install a supporting rim inside of the tire. See, e.g., Chinese Pat. Publ. No. CN1616264A. While the tire structure is not changed, the outer diameter of the supporting rim is less than the inner diameter of the tire tread and is more than the outer diameter of the wheel hub. If the air pressure of the tire is lost, the weight of the auto will be supported by the supporting rim so that the falling height of the wheel is decreased to realize a certain degree of safety protection. However, since the outer diameter of the supporting rim is less than the inner diameter of the tire tread, the tire rolling resistance is increased.

The other type is to improve the tire structure to allow the tire to have certain supporting strength after puncture to allow the tire to run a further distance. The existing fail safe tires are described, e.g. in China Pat. CN1264343A, China Pat. CN1265067A, and China Pat. CN1689847A. The fail safe tire has a similar shape and shares the same installation method as a normal pneumatic tire. However, since enough supporting strength needs to be ensured, the riding comfort is decreased and the resistance of the wheel is increased during normal operation.

SUMMARY OF THE INVENTION

Therefore, it is one objective of the present invention to provide an airbag device for a vehicle tire capable of stabilizing the auto timely when the tire is exploding or being punctured suddenly, keeping a normal running performance, and meanwhile, ensuring the driving comfort.

In order to realize the above objective, provided is an airbag device for a vehicle tire, comprising: a resilient outer ring installed between the tire and the wheel hub, and an inner ring serving to support the resilient outer ring. The normal tire air pressure of the tire is utilized to compress the resilient outer ring to the wheel hub to form enough space between the resilient outer ring and the inner surface of the tire and thereby to keep the resilient outer ring from contacting the inner surface of the tire tread. When the tire has exploded or the air pressure of the tire is lost, the resilient outer ring will expand instantly based on its self resilience to contact the inner surface of the tire tread and, under the supporting of the inner ring, to support the weight of the vehicle. Therefore, the vehicle can run stably an additional distance without changing the damaged tire.

In a class of this embodiment or in another embodiment of the invention, an airbag capable of compressing the resilient outer ring to the wheel hub under normal tire air pressure is added around the outer surface of the resilient outer ring, or optionally, is installed at the inner surface of the resilient outer ring. Optionally, the airbag can be one-piece formed with the inner surface of the resilient outer ring, and the inner cavity of the airbag is connected to the atmosphere. The airbag can be inflated by conventional means, such as for example, a vehicle airbag that is normally installed to minimize injuries to vehicle occupants during an accident.

In a class of this embodiment or in another embodiment of the invention, the airbag device is explosion-proof.

In a class of this embodiment or in another embodiment of the invention, is bullet-proof and immune to failure during an improvised explosive device (IED) attack. For example, the airbag device may be protected by the wheel rim in its folded state when the tire is in its normal operating condition.

In a class of this embodiment or in another embodiment of the invention, the cross section of the airbag is in a shape of Ω or O.

In accordance with one embodiment of the invention, the inner ring has a structure of a single side resilient supporting structure or a two-side symmetrical resilient supporting structure, wherein the bottom end of the resilient supporting structure is affixed to the wheel hub via a tightening ring or the inner edge of the tire. The resilient outer ring is capable of sliding on the resilient supporting structure, and a non-return structure is set on the resilient supporting structure, so that the resilient outer ring can only one-way slide to the top of the resilient supporting structure when the air pressure of the tire is losing and can not slide back under the function of the tire tread. Only when the tire is being filled in air and the sides of the resilient outer ring is stressed, the function of the non-return structure can be released to make the resilient outer ring compressible.

In a class of this embodiment or in accordance with another embodiment of the invention, the inner ring comprises an inner supporting member and a lateral supporting member, wherein the bottom end of the lateral supporting member is connected with a push rod, and the connection point (point K) between the lateral supporting member and the push rod serves to lock the bottom end of the inner supporting member and thus to fix the inner supporting member. An airbag is installed between the inner supporting member and the resilient outer ring. Under normal tire air pressure, the resilient outer ring can be compressed and locked at the lowest point (point B) of the inner supporting member. Once the air pressure of the tire is lost partially or fully, the resilient outer ring will be released from the lowest point B of the inner supporting member and moves to the stop point (point A) and then is non-return locked. The top end of the inner supporting member is further connected with a tightening ring.

In a class of this embodiment or in accordance with another embodiment of the invention, the inner ring and the resilient outer ring are formed as a one piece. Under normal tire air pressure, the air pressure of the tire first compresses the side of the airbag device for a vehicle tire inwardly deformed, and then the resilient outer ring is inwardly compressed until it is locked by a clip. When the air pressure of the tire is lost or diminished, the clip will be released, the inner ring and the resilient outer ring bounce quickly upwards simultaneously under the function of resilience force. When the tire is under normal operating pressure, the outer side of the deformed portion is non-extensional and the inner side of the deformed portion is non-compressible, so that the deformed portion cannot be bent inwardly.

In a class of this embodiment or in another embodiment of the invention, optionally, a compressible space can be set in the airbag close to the wheel hub side to avoid over high air pressure in the tire.

As a result, an airbag device for a vehicle tire without the need to fill in air in accordance with the invention having the functions of limiting the air pressure of the tire, proofing tire explosion, and acting as a spare wheel is installed inside of the tire, while the structure of the existing normal tire is kept unchanged. When the air pressure of the tire is normal, the airbag device is in a compressed status and does not contact the tread and inner surface of the tire, and a certain space therebetween is kept, so that the driving comfort and rolling resistance are not negatively influenced. As the temperature of the tire increases, a certain degree of pressure limiting can be realized when the inner pressure increases to a certain level. When the air pressure of the tire is lost or decreased to a certain degree, the airbag device can bounce instantly to support the tire tread to keep the tire running in a normal tire air pressure status, so that the vehicle can still be running a further distance at a relatively high speed without the risk of tire explosion and accidents.

Installed with the airbag device of the invention, the safety performance of the tire is improved, and the tire can be designed to be lighter, so that the tire resistance can be relatively decreased and the driving comfortability is relatively increased.

The tire an airbag device for a vehicle tire of the invention is suitable for various tires and thus has a wide applicability.

DETAILED DESCRIPTION OF THE PREFERRED EMBODIMENTS

The present invention will hereinafter be described further with reference to the accompanying drawings.

Example 1

Figure 1:
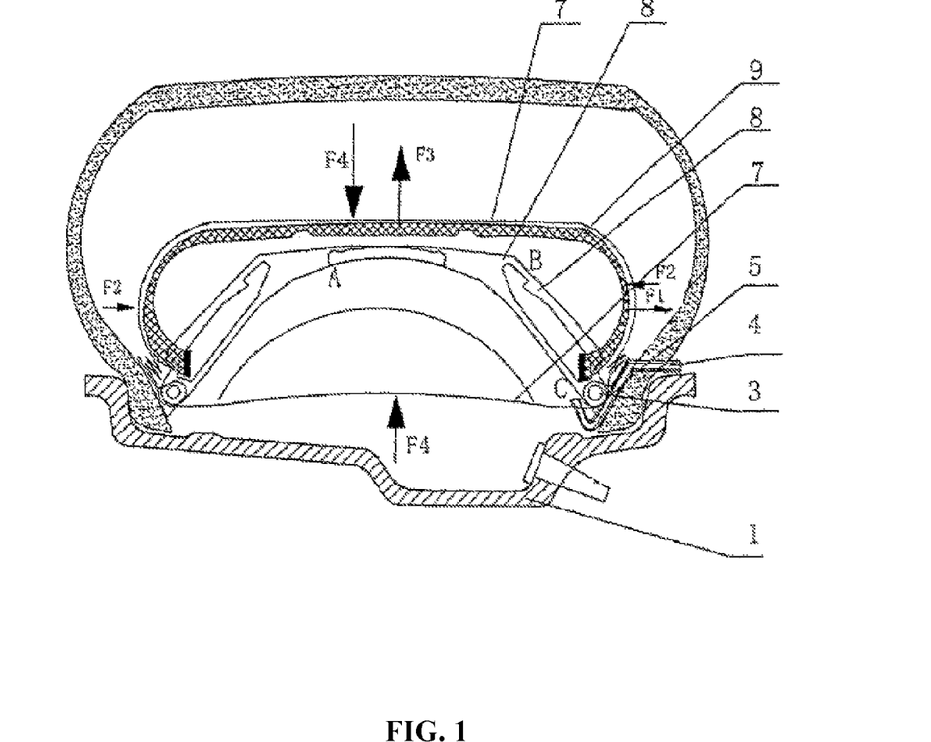
FIG. 1 is a structural view of an airbag device for a vehicle tire in accordance with one embodiment of the invention.
Figure 2:
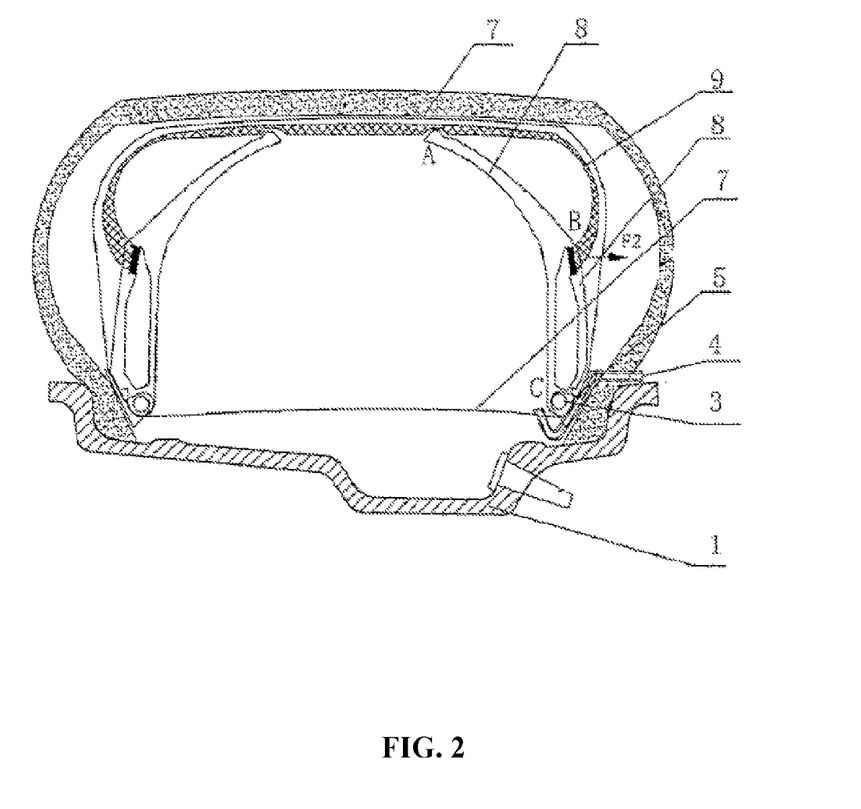
FIG. 2 is a structural view of the an airbag device for a vehicle tire of FIG. 1 expanding after tire explosion.

As shown in FIGS. 1-2, an airbag device for a vehicle tire comprises a resilient outer ring, an inner ring, and an airbag. The resilient outer ring is formed through the connection of an outer supporting member 9 and is compressible. The inner ring comprises an inner supporting member 8 and is fixed on the wheel hub 1 by a tightening ring 3. The tightening ring 3 is made of steel wire or carbon fiber. The outer ring of the airbag device is a compressible resilient body connected by a plurality of outer supporting members 9. In the event that a tire explodes, as shown in FIG. 2, the bottom end of the outer supporting member 9 slides on the section labeled BC of the inner supporting member 8. The tangential direction of the circumference of the outer ring has a certain degree of resilience. The two resilient sides of the outer supporting member 9 have enough resilient force F2 to ensure that the inner supporting member 8 bounces instantly and is then locked at point B.

As shown in FIG. 1, the weight of the vehicle after tire explosion is supported simultaneously by both the inner supporting member 8 and the outer supporting member 9. The inner and outer supporting members are made of light resilient alloy material to ensure that the weight of the airbag device (and the tire comprising it) is as light as possible. The BC section of the inner supporting member 8 should have enough strength, and the AB and DB sections should have good resilience and anti-fatigue performance. An airbag 7 is added to cover the outer surface of the supporting members, and is connected with the atmosphere through a vent hole 4. One or more vent holes can be set on the circumference of the airbag.

When filling in air for the tire, the airbag is compressed from all sides, and under the function of the side pressure F1 and the upper pressure F3, the outer supporting member 9 is released from point B and slides to point C and then is locked at point C (as shown in FIG. 1). Therefore, enough space is kept between the supporting member inside of the tire and the inner surface of the tire tread so that the operation of the tire under normal tire air pressure is not influenced. The airbag is normally made of hermetic compound material and has a certain degree of anti-pulling performance, and should be as light as possible. Optionally, the upper side of the airbag can be located underneath the outer supporting member 9 and is capable of compressing the outer supporting member by means of pulling. In this case, it can be ensured that the airbag does not contact the inner surface of the tire tread to reduce airbag abrasion. The connection piece 5 serves to lock the tightening ring 3 onto the tire.

Under normal tire air pressure, the airbag is in a compressed status, the inner side of the airbag can be set capable of being compressed further according to demand, the motion pressure of the inner side of the airbag is higher than the normal tire pressure and is lower than the safe pressure of the tire. When the tire pressure is increasing to the safe pressure due to the increase of tire temperature as the auto is running at high speed, the inner side of the airbag can be further compressed to the dash line to limit the tire pressure increase. When the temperature and air pressure of the tire decrease to the normal value, the inner side of the airbag will automatically return to normal. Once the tire loses the pressure F1 and F3, under the function of the resilience force F2 and F4, the outer circumference of the airbag device will expand immediately to support the pressure decreased or flat tire with a supporting force close to the normal situation of a tire with normal tire air pressure.

Normally, the weight of the airbag device is required to be as small as possible. According to application demand and manufacturing cost, the device can be made of light alloy or carbon fiber material and can have a hollow thin wall structure to control the weight of the tire. A certain degree of anti-fatigue performance is required for the frequently resilient bent portion of the airbag device.

Example 2

Figure 3:
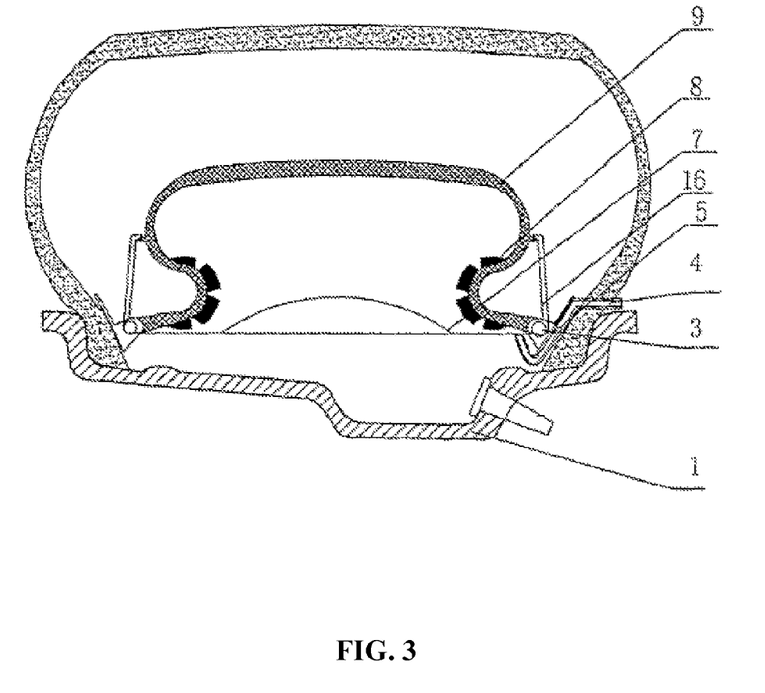
FIG. 3 is a structure view of an airbag device for a vehicle tire in accordance with another embodiment of the invention.
Figure 4:
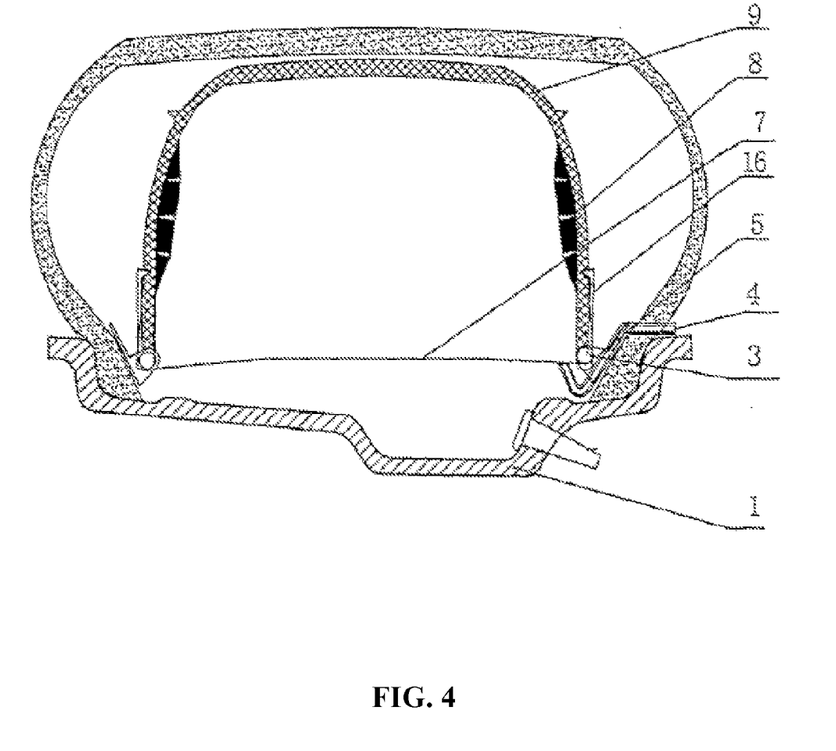
FIG. 4 is a structural view of the airbag device for a vehicle tire of FIG. 3 expanding after tire explosion.

Differentiated from Example 1, the inner ring and the resilient outer ring are designed as two separate parts. The size of the resilient outer ring can be changed accordingly since the resilient outer ring is sliding on the inner ring. As shown in FIGS. 3-4, the inner ring and resilient outer ring are formed as one piece. The resilient deformation of the inner ring 8 is utilized to adjust the size of the resilient outer ring. As shown in FIG. 4, when the tire air pressure is normal, the air pressure compresses the inner ring bent deformed inwardly, and at the same time, the resilient outer ring 9 is compressed inwardly until it is locked by clip 16. As shown in FIG. 4, when the air pressure of the tire is lost, the clip 16 is released and deformed under the function of tire tread pressure, and the airbag device is then unfolding.

Examples 3

Figure 5:
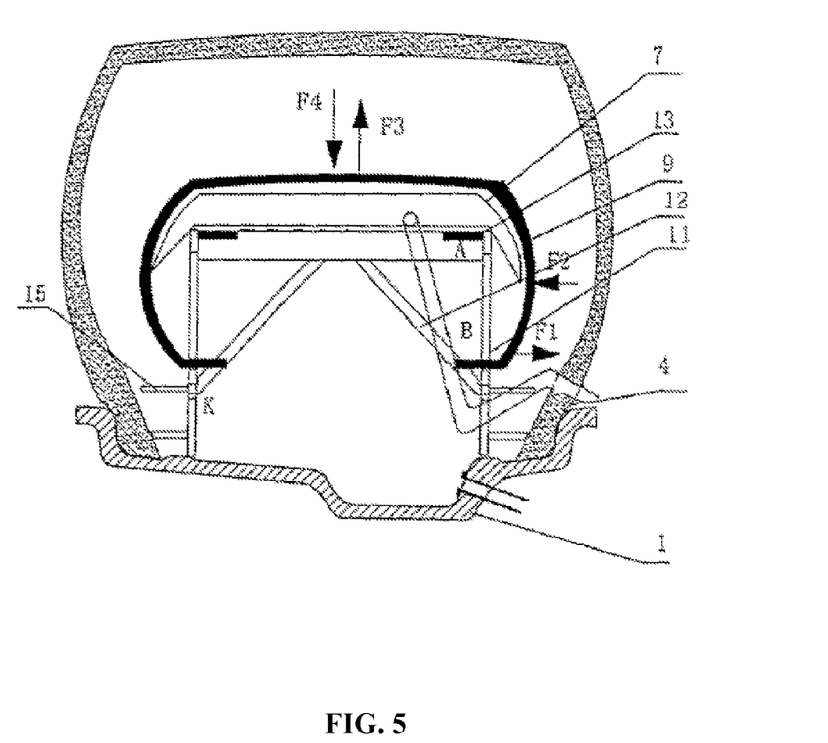
FIG. 5 is a structure view of an airbag device for a vehicle tire in accordance with another embodiment of the invention.
Figure 6:
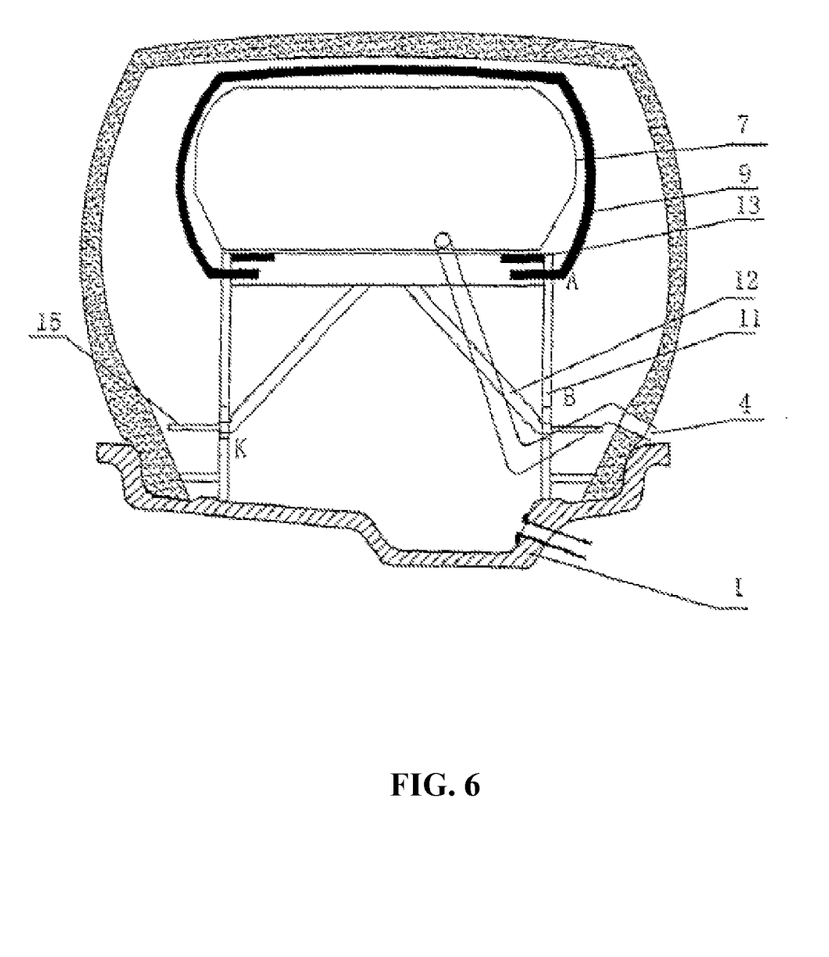
FIG. 6 is a structural view of the airbag device for a vehicle tire of FIG. 5 expanding after tire explosion.

As shown in FIGS. 5-6, at least one inner supporting member 11 and at least one lateral supporting member 12 serve to form a fixed supporting member. The bottom end of the lateral supporting member 12 is connected with a push rod 15, and the connection point (point K) therebetween serves to lock the bottom end of, and thus to fix, the inner supporting member 11. When disassembling the tire, pushing and compressing the outer edge of the tire to release the lateral supporting member 12 from point K of the inner supporting member 11 via the push rod 15. The inner supporting member is then capable of being bent inwardly to push the tire edge to the deep slot of the wheel hub so that the tire can be disassembled and repaired.

As shown in FIG. 5, the airbag 7 can be located between the inner supporting member 11 and the outer supporting member 9. Under normal tire pressure, the tire pressure is utilized to compress the outer supporting member 9 to point B and then is fixedly-locked there. As shown in FIG. 6, once the air pressure of the tire is lost, the outer supporting member 9 is released from point B and, under the function of resilient force, is sliding to point A and is locked there. The tightening ring 13 is connected with the fixed supporting member, and is clip-locked on the wheel hub.

In accordance with the present invention, an airbag device having a variable outer diameter is installed inside of the tire, and is set with an airbag connected with the outer atmosphere. When the air pressure of the tire is normal, the pressure of the tire is utilized to compress the airbag so as to decrease the outer diameter of the airbag device and also to lock the airbag device. A certain space is formed between the airbag device and the inner surface of the tire so that the operation of the tire is not influenced. When the air pressure of the tire is increased during normal operation due to the increase of tire temperature, the compressible portion of the airbag can be further compressed to limit the increase of the tire air pressure. When the tire is exploding or the air pressure of the tire is lost, the airbag device will bounce instantly under the function of self resilience and centrifugal force to support the flat tire so that the auto can be run a further distance at relatively high speed.

Figure 7:
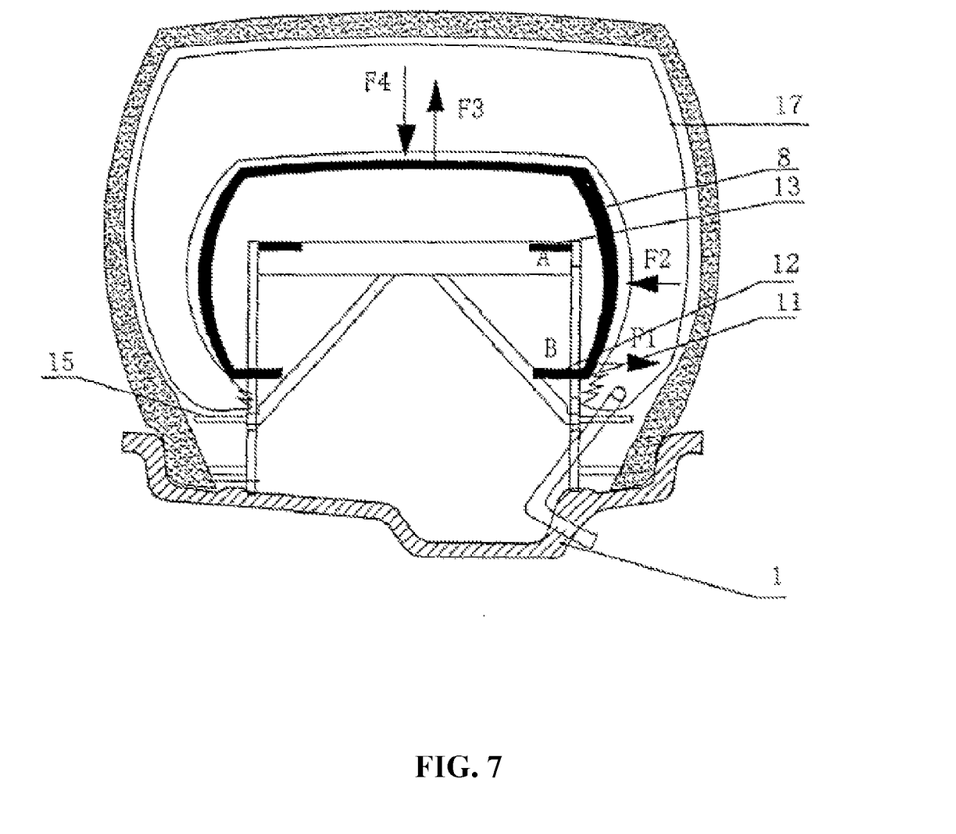
FIG. 7 is a structural view an airbag device for a vehicle tire in accordance with another embodiment of the invention.
Figure 8:
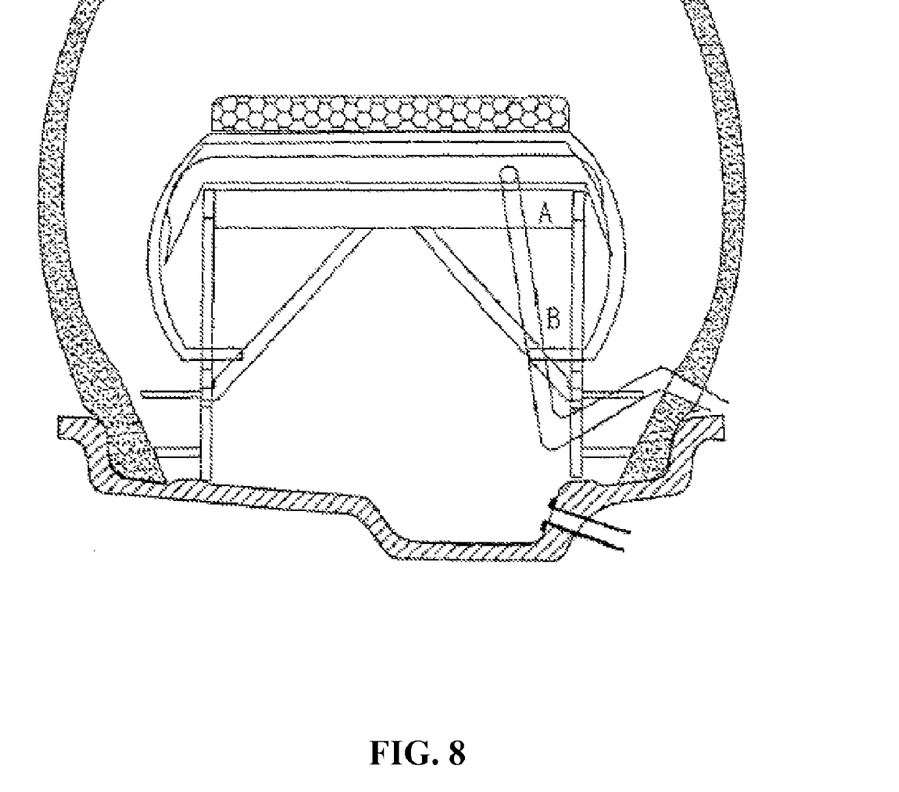
FIG. 8 is a structural view of an airbag device for a vehicle tire in accordance with another embodiment of the invention.
Figure 9:
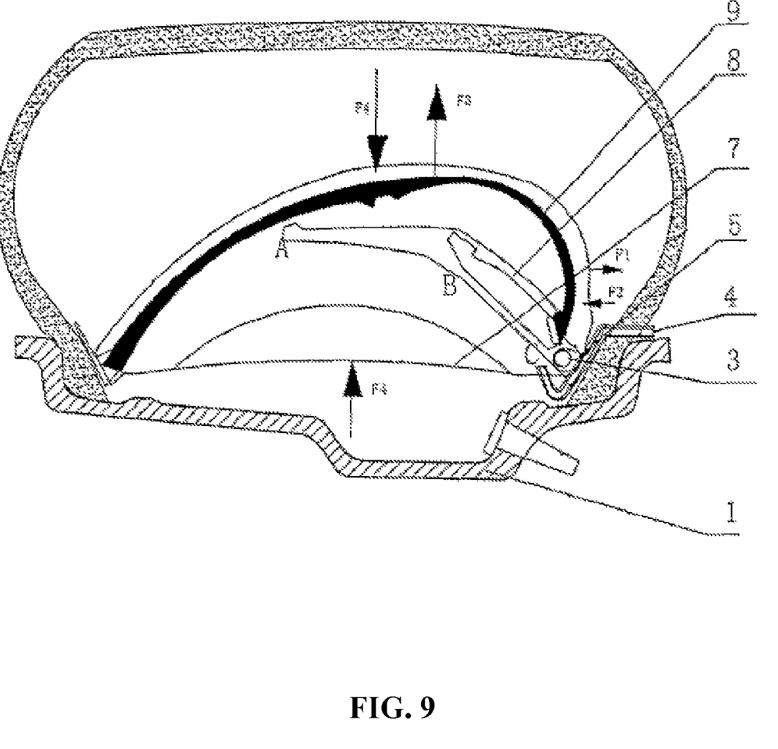
FIG. 9 is a structural view of an airbag device for a vehicle tire in accordance with another embodiment of the invention.
Figure 10:
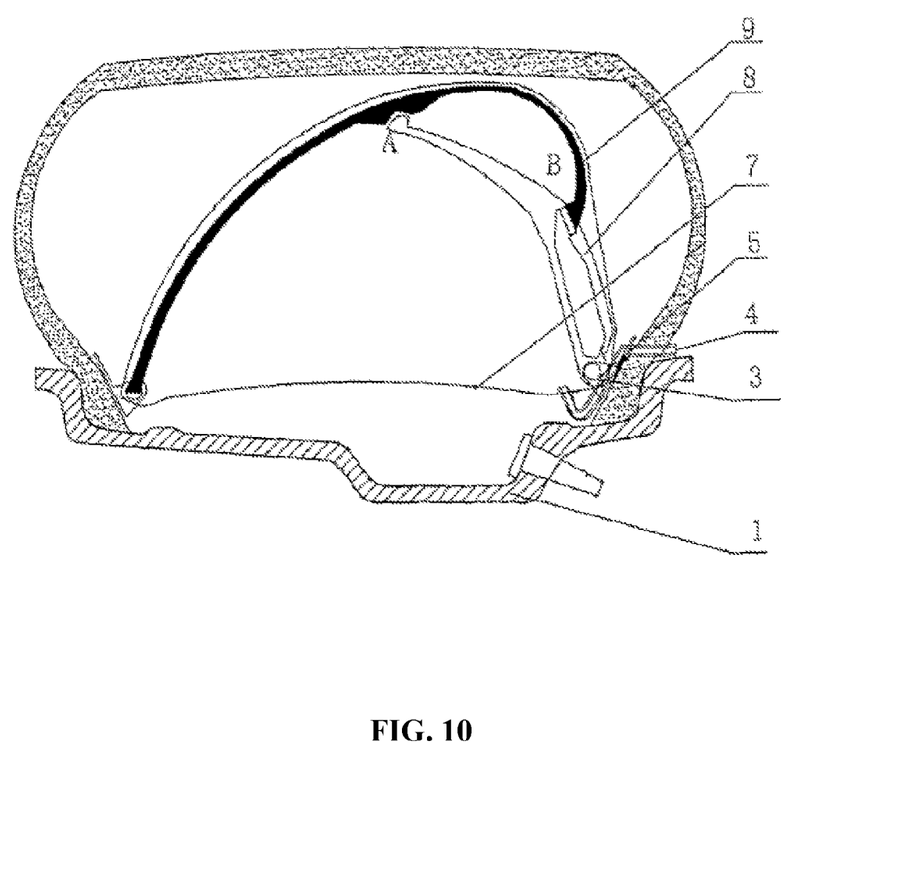
FIG. 10 is a structural view of the airbag device for a vehicle tire of FIG. 9 expanding after tire explosion.
Figure 11:
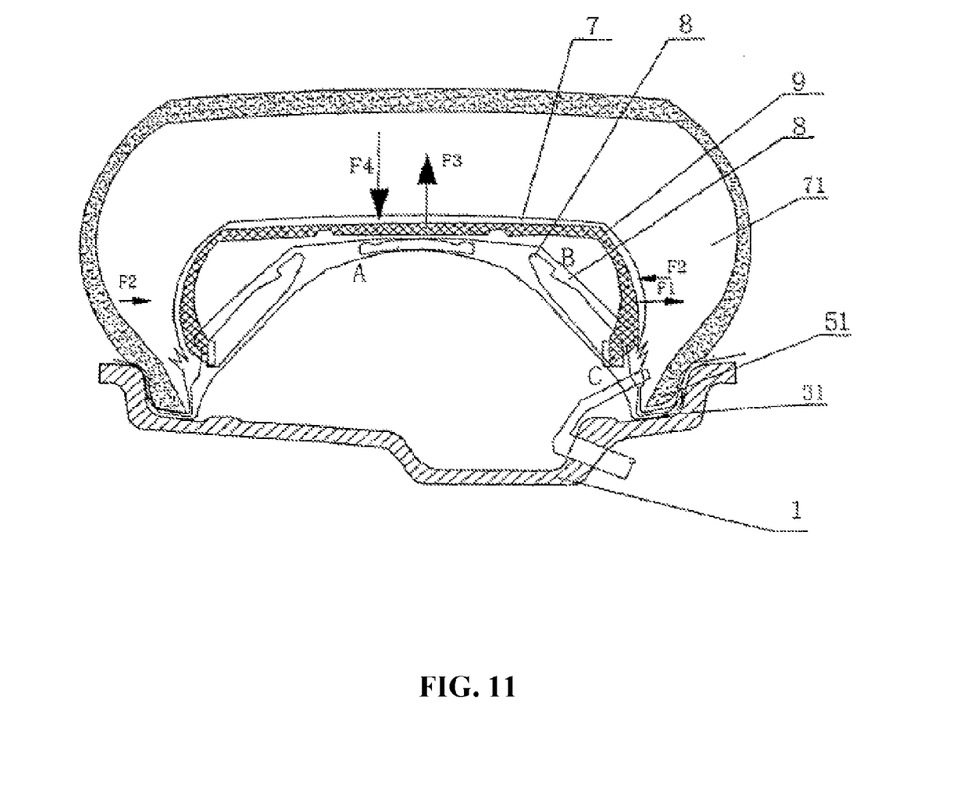
FIG. 11 is a structural view of an airbag device for a vehicle tire in accordance with another embodiment of the invention.
Figure 12:
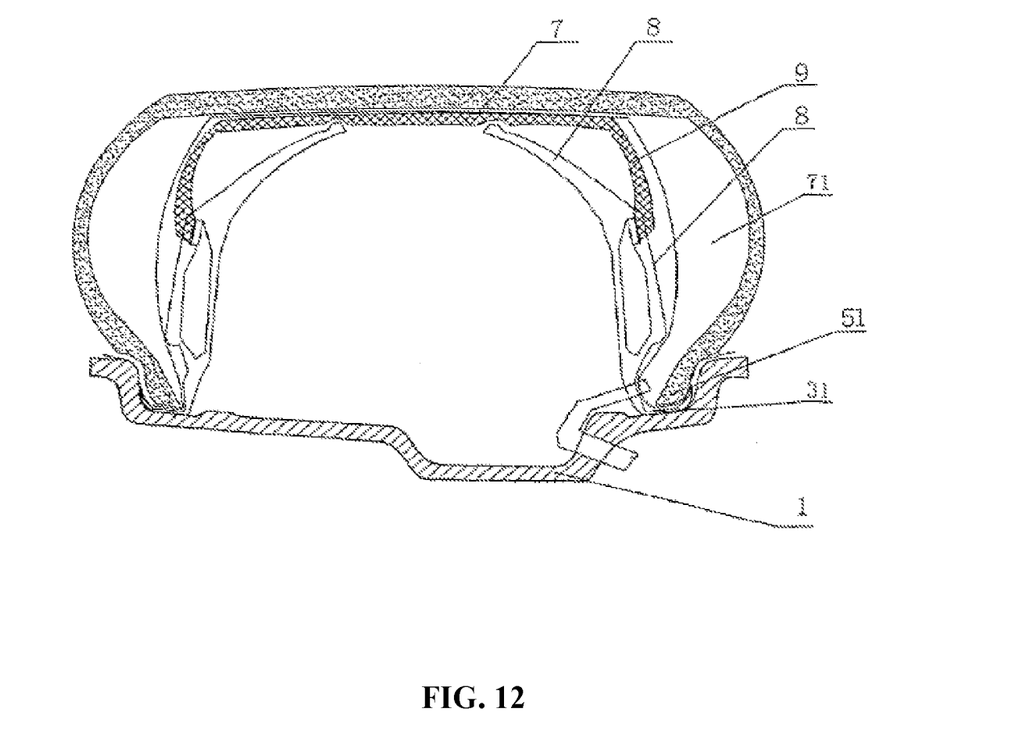
FIG. 12 is a structural view of the airbag device for a vehicle tire of FIG. 11 expanding after tire explosion.

This invention is not to be limited to the specific embodiments disclosed herein and modifications for various applications and other embodiments are intended to be included within the scope of the appended claims. While this invention has been described in connection with particular examples thereof, the true scope of the invention should not be so limited since other modifications will become apparent to the skilled practitioner upon a study of the drawings, specification, and following claims. For example, as shown in FIG. 7, the airbag device is also applicable for a tire having an inner tire, and can be compressed by the inner tire. As shown in FIG. 8, in order to reduce the abrasion of the inner surface of the tire and to improve comfort when the airbag device is in an unfolded position, a foam elastic material can be coated on the upper surface of the outer supporting member. As shown in FIGS. 9-10, the two-side symmetrical supporting structure in Example 1 can be changed to a single side supporting structure to simplify the structure so as to properly decrease the device weight and cost. Besides, the cross section of the airbag can be designed in a shape of an Ω or an O. As shown in FIGS. 11-12, the two side edges of the Ω shaped airbag are clipped on the tire ring 51, and the tire ring 51 also serves to compress tightly the two side edges of the Ω shaped airbag onto the wheel hub. An air chamber 71 is formed between the Ω-shaped airbag and the tire. When the vent hole 4 is passing through the Ω shaped airbag to fill in the tire, the outer supporting member 9 will be compressed simultaneously. As shown in FIG. 12, the space formed between the Ω shaped airbag and the wheel hub is connected to the outer air through the gap formed by the vent hole, equivalent to a compressible airbag. The bottom 31 of the inner supporting member is also hooked on the tire ring 51.

What is claimed is:

1. An airbag device for a vehicle tire, comprising:
 a resilient outer ring installed between the tire and a wheel hub, and
 an inner ring serving to support said resilient outer ring, wherein
  during normal operation of the tire, said resilient outer ring is in a contracted state, and abuts the wheel hub; a free space is formed between said resilient outer ring and an inner surface of the tire; and said resilient outer ring does not contact said inner surface of the tire;
  after loss of normal tire pressure, said resilient outer ring is an expanded state, abuts said inner surface of the tire, and together with said inner ring supports the weight of a vehicle;
  said inner ring comprises an inner supporting member and a lateral supporting member;
  the bottom end of said lateral supporting member is connected with a push rod;
  a connection point between said lateral supporting member and said push rod serves to lock the bottom end of said inner supporting member whereby fixing said inner supporting member;
  an airbag is installed between said inner supporting member and said resilient outer ring;
  during normal operation of the tire, said resilient outer ring is compressed and locked at the lowest point of said inner supporting member;
  after loss of normal tire pressure, said resilient outer ring is released from said lowest point of said inner supporting member and moves to the stop point and then is locked so that it cannot return back; and
  the top end of said inner supporting member is further connected with a tightening ring.

2. The device of claim 1, wherein
 said inner ring has a single-side supporting structure or a double-side supporting symmetrical structure; a bottom end of said inner ring being affixed to said wheel hub via a tightening ring or to the inner edge of the tire;
 said resilient outer ring is slidable on said inner ring;

a non-return structure is disposed on said inner ring, so that said resilient outer ring is slidable to the top of said inner ring when normal tire air pressure is lost and is not slidable back under the function of the tire tread unless the tire is refilled with air and the sides of said resilient outer ring are pressed together.

3. The device of claim 1, wherein a lock slot is disposed at the bottom end of said inner ring to lock said resilient outer ring when it is compressed so as to avoid said resilient outer ring swinging out by the centrifugal force.

4. The device of claim 1, wherein said inner ring and said resilient outer ring are formed as one piece;

during normal operation of the tire, the air pressure of the tire first compresses the side of the airbag device for a vehicle tire inwardly deformed, and then said resilient outer ring is inwardly compressed until it is locked by a clip;

after loss of normal tire pressure, the clip is released, said inner ring and said resilient outer ring bounce quickly and simultaneously upwards under the function of resilient force.

5. An airbag device for a vehicle tire, comprising:

a resilient outer ring installed between the tire and a wheel hub, and an inner ring serving to support said resilient outer ring, wherein during normal operation of the tire, said resilient outer ring is in a contracted state, and abuts the wheel hub; a free space is formed between said resilient outer ring and an inner surface of the tire; and said resilient outer ring does not contact said inner surface of the tire;

after loss of normal tire pressure, said resilient outer ring is an expanded state, abuts said inner surface of the tire, and together with said inner ring supports the weight of a vehicle;

said inner ring and said resilient outer ring are formed as one piece;

during normal operation of the tire, the air pressure of the tire first compresses the side of the airbag device for a vehicle tire inwardly deformed, and then said resilient outer ring is inwardly compressed until it is locked by a clip;

after loss of normal tire pressure, the clip is released, said inner ring and said resilient outer ring bounce quickly upwards simultaneously under the function of resilient force.

* * * * *